March 11, 1958 H. N. BEVERIDGE ET AL 2,826,408

ELECTROSTATIC TAPE DRIVE CONTROL SYSTEMS

Filed April 15, 1955

INVENTORS
HAROLD N. BEVERIDGE
ALBERT J. DEVAUD
BY Elmer J. Gorn
ATTORNEY

United States Patent Office 2,826,408

Patented Mar. 11, 1958

2,826,408

ELECTROSTATIC TAPE DRIVE CONTROL SYSTEMS

Harold N. Beveridge, Kenilworth, Ill., and Albert J. Devaud, Waltham, Mass., assignors, by mesne assignments, to Minneapolis-Honeywell Regulator Company, a corporation of Delaware Application April 15, 1955, Serial No. 501,604

3 Claims. (Cl. 271—2.3)

This invention relates to an electrostatic tape drive control system, and more particularly to the use of alternating voltage for controlling the movement of tape in said electrostatic tape drive. A suitable tape drive mechanism has been fully disclosed in a copending application entitled "Electrostatic Tape Drive," by Harold N. Beveridge, filed April 15, 1955, Serial No. 501,605.

This invention discloses how a first member and a second member each responsive to electrostatic forces are caused to frictionally engage each other by applying an alternating voltage, said alternating voltage generating the electrostatic forces necessary to frictionally engage said first member and said second member with each other. An embodiment of this invention comprises a capstan arranged to control the movement of a tape, said capstan and said tape each responsive to electrostatic forces, means responsive to the application of an alternating voltage control signal for generating electrostatic forces, and means for frictionally engaging said capstan and said tape with each other. A suitable tape responsive to electrostatic forces has been fully disclosed in a copending application entitled "Electrostatic Tape and Method of Construction," by Albert J. Devaud, filed April 25, 1955, Serial No. 503,752. The electrostatic forces referred to previously are generated between the capstan and a conductive member bonded to the tape. The capstan consists of a conductive member bonded to a nonconductive member, said nonconductive member placed in such a position as to be capable of making contact with a second member, such as the tape. The electrostatic tape drive or electrostatic clutch acts on the principle of the attraction of two plates of an electrically charged condenser. The capstan of the electrostatic clutch acts as one of these plates, and the electrically conductive member in the tape as the other. It can be seen that, since the tape acts as one plate of an electrostatic clutch, all moving masses and magnetic fields always needed in previous collecting mechanisms are eliminated since the tape is acted upon directly.

In the present invention, the application of an alternating voltage control signal to the conductive member of the capstan will immediately cause electrostatic forces to appear between the conductive portion of said tape previously referred to and said capstan, thereby immediately attracting said tape to said capstan. The improved acceleration time achieved by this system of applying electrostatic forces between a capstan and a tape is duplicated in the deceleration time of said tape by simply applying a voltage between a stationary portion of the capstan and said conductive member on said tape. It will be noted, therefore, that for deceleration, the electrostatic forces are applied between the conductive member on said tape and the stationary portion of said capstan as opposed to acceleration, which is achieved by applying electrostatic forces between said conductive member of said tape and the movable portion of said capstan.

Further objects and advantages of this invention will be apparent as the description progresses, reference being made to the accompanying drawings, wherein.

Figure 1:
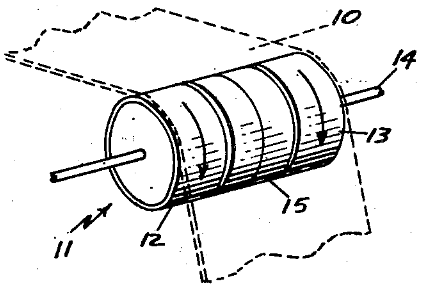
Fig. 1 is an illustration of a four-section capstan assembly.

Referring now to Fig. 1, there is shown a tape 10 in contact with a four-section capstan 11. Capstan 11 is called a split capstan since both driving sections 12 and 13 are separate or split and directly attached to shaft 14, whereas the stationary nonrotating section 15 is mounted on ball bearings and is free to rotate about shaft 14. Suitable means (not shown) holds section 15 stationary so that it will not rotate as shaft 14 rotates. In order to control the movement of tape 10 about capstan 11, an alternating voltage control signal is fed to rotating sections 12 and 13 thereby causing the tape and the rotating sections of the capstan to become frictionally engaged with each other. As long as the tape and the rotating sections of the capstan are engaged, the tape will move in the direction of rotation of said capstan. In order to apply a braking action, an alternating voltage control signal is impressed across stationary member 15, thereby causing electrostatic forces to be exerted between the tape and the stationary portion of the capstan. It will be noted, therefore, that control of the movement of the tape is accomplished by simply controlling a voltage which can be readily done by electronic means.

Figure 2:
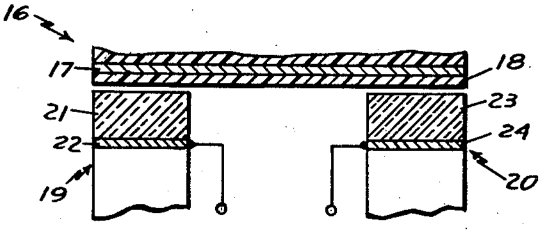
Fig. 2 is a cross section of a tape and the movable members of a rotating capstan.

In Fig. 2 there is shown a cross section of a tape 16 having a conductive member 17 and a nonconductive member 18 bonded thereto. Sections 19 and 20 illustrate the end rotating sections of a capstan. Rotating section 19 consists of a dielectric member 21 bonded to a conductive member 22. In a similar manner, rotating section 20 consists of a dielectric member 23 bonded to a conductive member 24. The stationary member which is not illustrated also consists of a conductive member bonded to a nonconductive member, the only difference being that the stationary member is held in a fixed position by external means, not illustrated.

Figure 3:
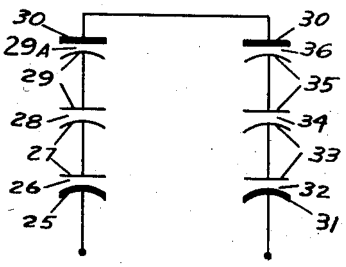
Fig. 3 is an equivalent electrical diagram of Fig. 2.

Fig. 3 illustrates an equivalent electrical circuit of Fig. 2. Plate 25 represents conductive member 22, dielectric 26 represents nonconductive member 21, plates 27 represent the surface charge on nonconductive member 21, dielectric member 28 represents the dielectric of the air between nonconductive member 21 of the capstan and nonconductive member 18 of the tape, plates 29 represent the surface charge on nonconductive member 18, 29A represents the dielectric of nonconductive member 18, and plate 30 represents conductive member 17. In a similar manner, plate 31 represents conductive member 24, 32 represents the dielectric of nonconductive member 23, plates 33 represent the surface charge on nonconductive member 23, 34 represents the dielectric of the air between nonconductive member 23 and nonconductive member 18, plates 35 represent the surface charge on nonconductive member 18, 36 represents the dielectric of nonconductive member 18, and again plate 30 represents conductive member 17 on the tape. It can be seen, therefore, that the electrostatic forces are generated within a capacitive circuit made up of a capstan and the tape.

Figure 4:
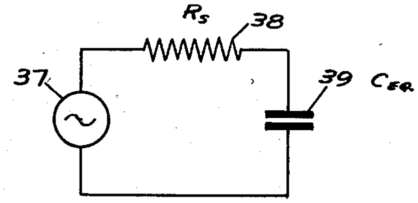
Fig. 4 is an equivalent electrical diagram of a complete alternating voltage control system.

Referring now to Fig. 4, there is shown an equivalent circuit diagram of the tape drive mechanism consisting of an alternating source voltage 37 in series with resistance 38, representing the in phase losses of the circuit, in series with a capacitor 39 which represents the equivalent capacitive circuit of the tape drive mechanism as shown in Fig. 3. In previous electrostatic tape drives, the control voltage consisted of a large direct current that was applied to the capstan. This direct current caused the plate and the capstan to adhere in a very satisfactory manner, but unfortunately when the direct current was removed, the tape continued to adhere quite strongly. This situation severely hampered the electrostatic tape drive where extremely fast acceleration and deceleration times were required. By the use of an alternating current control voltage, it was discovered that the migrating charge problem disappeared because of the short time during which a given polarity existed on the tape, and further, that the bound surface charge problem also largely disappeared. The application of an alternating current control voltage caused the tape to adhere tightly to the capstan when the voltage was applied and when the voltage was removed, the tape again became free on the capstan. It was thus discovered that the only limiting factor in the use of alternating current in an electrostatic tape drive mechanism was the insulation material separating the conductive member on the capstan and the conductive member on the tape that is to be controlled. In order to prevent slipping of the tape on the capstan, it was found that a frequency of the order of 1 kilocycle or higher had to be used for the alternating current control voltage, thereby eliminating any possible slip of the tape during that part of the cycle when the voltage is low and changing polarity.

Figure 5:
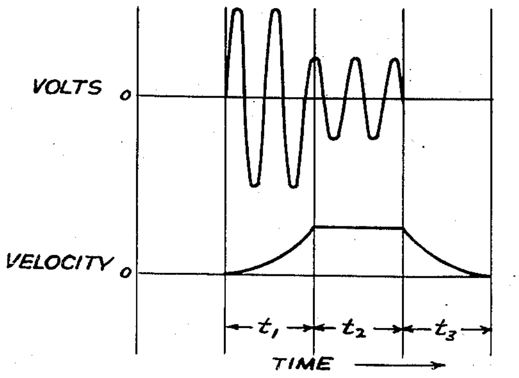
Fig. 5 illustrates a preferred wave form capstan voltage.

It is believed that, when the stationary tape is wrapped about a rotating capstan, it simply floats on a thin film of air which acts as a lubricant between the tape and the rotating capstan. This film of air is of the order of 100 micro-inches thick. In the usual course of operation, the tape is never left free on the rotating capstan, that is, it is either attracted to the braking capstan or to the rotating capstan. In order to change the condition of the tape either from a moving to a braking condition, or from a braked to a moving condition, it is necessary first to remove this film of air, and it is this time that is spent in squeezing out the air that is represented as time $t_1$ in Fig. 5. It has been determined that for this time $t_1$ during which the tape is being attracted to the capstan, a voltage of a higher magnitude can be used than is necessary for the driving voltage needed to continue the tape in contact with the capstan which is represented by time $t_2$ in Fig. 5. For deceleration, this thin film of air previously referred to must be driven out between the tape and the fixed, or nonrotating section of the capstan. This deceleration time is represented as time $t_3$ in Fig. 5. For quick acceleration and deceleration of the tape, it is necessary that the voltage rise quickly on one movable section of the capstan and at the same time drops quickly on the opposite movable section of the capstan. Moreover, the voltage at the very beginning must be high enough to impart the required acceleration to the tape, causing it to overcome its own inertia and the drag exerted by the system on the tape. When the tape is either stopped or is running at full speed, the steady state voltage on the capstan may be smaller because of the existing inertia forces on the tape. It has also been determined in using alternating current to control the electrostatic forces between the capstan and the tape that in order to successfully stop the tape in the shortest possible time, it is necessary to remove the driving voltage as it passes through zero, as shown in Fig. 5, before the braking force is applied. If this is not done, there would exist a trapped charge on the tape which would first have to be dissipated before the tape would respond to the braking force, thereby unduly delaying the braking time. In other words, it would be similar to a D. C. charge on the tape as was previously explained. Since it is not always possible to remove the braking voltage as it goes through zero when using an alternating current drive voltage, the problem of trap charges has been eliminated to a great extent by the use of an alternating frequency driving voltage having a frequency greater than one thousand cycles per second.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

What is claimed is:

1. A clutch mechanism for a movable tape having an electrostatically attractive member therein comprising a pair of cylindrical tape motion controlling members, each having an electrically conducting member with an electrical insulating material on the surface thereof and each adapted to be positioned so that the electrical insulating material is adjacent to said tape, a source of alternating voltage, and electrical circuit means adapted to connect said source to said electrically conducting members to cause an electrostatic force to attract said tape into engagement with said members.

2. A clutch as claimed in claim 1 wherein said source of alternating voltage has a frequency greater than 1000 cycles per second.

3. Apparatus for controlling the movement of a movable tape having an electrostatically attractive member therein in the form of an electrically conductive member comprising a pair of cylindrical members coaxially mounted and operable to attract the tape to the surface thereof to control the motion of the tape in accordance with the motion of said cylindrical members, said cylindrical members each comprising an electrically conducting member having a cylindrical surface formed thereon of an electrical insulating material which is adapted to engage the tape, a source of alternating current, and a pair of electrical connectors connected to the electrically conducting members of each of said cylindrical members and adapted to connect said alternating current source to said conducting members to create an electrostatic field to attract said tape into engagement with said insulating material.

References Cited in the file of this patent

UNITED STATES PATENTS

| | | |
|---|---|---|
| 287,957 | Osborne | Nov. 6, 1883 |
| 1,155,727 | Harwood | Oct. 5, 1915 |
| 2,141,104 | Buccione | Dec. 20, 1938 |
| 2,148,482 | Lorenz | Feb. 28, 1939 |
| 2,193,189 | Brooke | Mar. 12, 1940 |
| 2,245,731 | Spreine | June 17, 1941 |
| 2,417,850 | Winslow | Mar. 25, 1947 |
| 2,459,260 | Brown | Jan. 18, 1949 |
| 2,576,882 | Koole | Nov. 27, 1951 |